United States Patent [19]
Kuno et al.

[11] Patent Number: 5,203,092
[45] Date of Patent: Apr. 20, 1993

[54] DRYING APPARATUS AND ITS CONTROL DEVICE FOR ROTARY PRINTING PRESS

[75] Inventors: Hiroaki Kuno; Kazutoshi Yokoo, both of Hiroshima; Kuniaki Tanouchi; Chie Kuwada, both of Tokyo; Minoru Yoshida, Mihara, all of Japan

[73] Assignee: Mitsubishi Jukogyo Kabushiki Kaisha, Tokyo, Japan

[21] Appl. No.: 801,461

[22] Filed: Dec. 2, 1991

[30] Foreign Application Priority Data

Dec. 3, 1990 [JP] Japan .................. 2-400261
Dec. 27, 1990 [JP] Japan .................. 2-408230

[51] Int. Cl.$^5$ .......................................... F26B 19/00
[52] U.S. Cl. ............................. 34/48; 34/156; 34/86; 34/79
[58] Field of Search ............ 34/155, 156, 79, 26, 34/32, 86, 48

[56] References Cited

U.S. PATENT DOCUMENTS

| 4,150,495 | 4/1979 | Stern | 35/54 |
| 4,341,167 | 7/1982 | St. John | 110/235 |

FOREIGN PATENT DOCUMENTS

| 0273230 | 7/1988 | European Pat. Off. . |
| 3616333C1 | 4/1987 | Fed. Rep. of Germany . |
| 64-83912 | 3/1989 | Japan . |

OTHER PUBLICATIONS

Abstract, 91120514.4.
Patent Abstracts of Japan, JP-A-2 263 648, vol. 15, No. 13 (M-1069), Jan. 11, 1991.
Patent Abstracts of Japan, JP-A-58 124 113, vol. 7, No. 230 (M-249) (1375), Oct. 12, 1983.

Primary Examiner—Henry A. Bennett
Attorney, Agent, or Firm—Jacobson, Price, Holman & Stern

[57] ABSTRACT

In the drying apparatus for rotary printing press for drying the ink on the printed paper which has a direct fired deodorizing apparatus (8) and a heat recovery apparatus (9) for heating the hot air circulating in a drying apparatus (1) by using the exhaust gas from the deodorizing apparatus, the drying apparatus and its control device are so adapted that a bypass line (20) is installed on the hot air circulation line to bypass the heat recovery apparatus to control the temperature of printed paper and/or the temperature of hot air blowing from nozzles (3) by adjusting the degree of opening of a bypass damper (21) disposed in the bypass line, and the burning amount of the burner for deodorization is controlled so that the deodorizing apparatus furnace temperature corresponding to the blowing hot air temperature (16) or paper temperature (17) is obtained. Further, the control device carries out the control in response to the change in printing speed. Thus, the control responsiveness can be enhanced.

8 Claims, 13 Drawing Sheets $\dfrac{\Delta V_s}{\Delta t}$ : CHANGE RATE OF PRINTING SPEED WITH TIME $x_1, x_2, y_1, y_2$ : PARAMETERS

FIG. 9

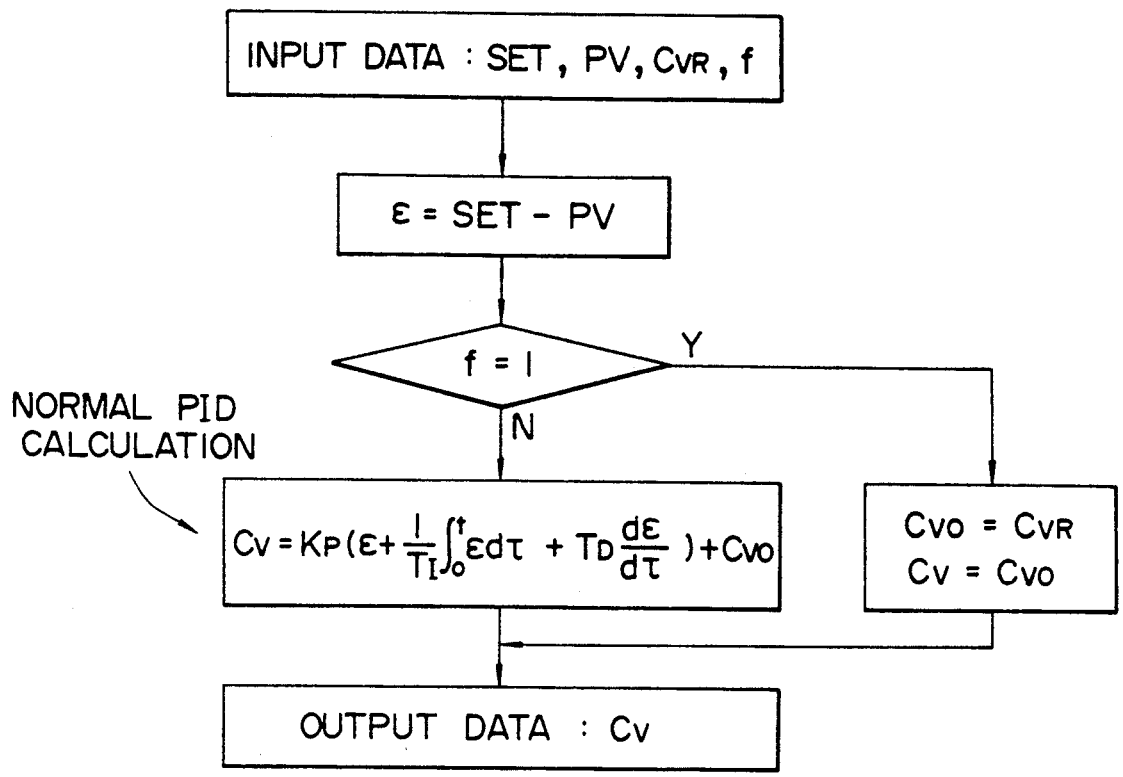

SET : TARGET VALUE OF PAPER TEMPERATURE
PV : DETECTED VALUE OF PAPER TEMPERATURE
$C_{VR}$ : RESET VALUE OF CONTROL OUTPUT
f : FLAG
Cv : CONTROL OUTPUT
Kp : PROPORTIONAL GAIN
$T_I$ : INTEGRAL TIME
$T_D$ : DERIVATIVE TIME
Cvo : INITIAL VALUE OF Cv
$\tau$ : TIME
t : TIME AFTER THE CHANGEOVER OF f = 0 TO 1, OR TIME AFTER THE CHANGEOVER OF PAPER TEMPERATURE CONTROL OPERATION SWITCH FROM OFF TO ON

DRYING APPARATUS AND ITS CONTROL DEVICE FOR ROTARY PRINTING PRESS

BACKGROUND OF THE INVENTION

1. Field of the Invention

This invention relates to a drying control device for printed paper drying apparatus which evaporates the solvent in ink by blowing hot air onto the printed paper. More particularly it relates to a hot air heating type drying apparatus for a rotary printing press which evaporates the solvent in ink by feeding printed paper into a drying apparatus body having a negative pressure and by blowing hot air onto the paper. The apparatus according to this invention can be applied to exhaust gas disposal apparatus for solvent-containing substances in the production process of plastic film and the like. Still more particularly, this invention relates to a paper temperature control device of drying apparatus for a rotary printing press.

2. Description of the Related Art

A conventional drying apparatus for a printing press will be described with reference to FIG. 13. Reference numeral 1 denotes a drying apparatus body, 2 denotes printed paper, 3 denotes a hot air blowing nozzle provided in the drying apparatus 1, 4 denotes a burner for heating the hot air, 5 denotes a blower for the first zone, 6 denotes a blower for the second zone, and 7 denotes an exhaust gas blower, and 8 denotes a deodorizing apparatus.

The paper 2 printed by the printing press is fed into the drying apparatus body 1, and the hot air from the burner 4 is blown onto the paper through the hot air blowing nozzles 3 so that the solvent in ink is evaporated. The hot air, which has been blown onto the paper 2 in the drying apparatus body 1 from the hot air blowing nozzles 3, is returned to the suction side of the blower for the first zone 5 and the blower for the second zone 6, and is then reheated by the burner 4 and sent to the hot air blowing nozzles 3. Part of the hot air is sucked by the exhaust gas blower 7 and sent to the deodorizing apparatus 8, where the gas is deodorized. Part of the deodorized gas is returned to the drying apparatus body 1, and the remnant is discharged into the atmosphere. For pollution prevention, a negative pressure is produced in the drying apparatus body 1 to prevent the hot gas (exhaust gas) in the drying apparatus body 1 from discharging to the outside.

The conventional drying apparatus for a rotary printing press shown in FIG. 13 has the following disadvantages:

(1) The apparatus has a high consumption of fuel because the fuel supplied to the burner 4 is burned to reheat the hot air circulating in the drying apparatus body.

(2) The operation cannot be performed while the amount of exhaust gas is restricted because if the concentration of solvent in the exhaust gas is raised by the restriction of exhaust gas discharged from the deodorizing apparatus 8, the temperature in a catalytic reactor provided in the deodorizing apparatus 8 becomes too high (rises to about 500° C., the upper limit of temperature).

(3) A large-size exhaust gas blower 7 is required. This is because large amounts of outside air (air for combustion) is introduced into the drying apparatus body 1 since the temperature of circulating hot air or the temperature of paper is kept at about 190°–250° C. by controlling the burning conditions of burner 4 disposed in the circulation line, so that large amounts of exhaust gas must be discharged by the exhaust gas blower 7 to maintain the negative pressure in the drying apparatus body 1

(4) The capacity of burner 4 disposed in the circulation line must be 3–5 times higher than the capacity needed for normal operation in order to speed up the startup operation since the rotary printing press is frequently stopped for change of plates.

To solve these problems, the inventors made an invention shown in FIG. 14 (refer to Japanese Patent Application No. 083912/1989 (1-083912)).

In FIG. 14, reference numeral 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 13 denotes a hot air temperature control device for regulating burning at the burner 10 for deodorization for the direct fired deodorizing apparatus 8 based on a value detected by a temperature sensor 16 for the hot air blown from the nozzles, 14 denotes a paper temperature control device for regulating burning at the burner for deodorization 10 in the direct fired deodorizing apparatus 8 based on the value detected by a paper temperature sensor 17, and 15 denotes a selector switch.

At the startup before the normal operation, the exhaust gas blower 7 is activated to draw the outside air (air for combustion) into the drying apparatus body 1. The outside air drawn into the drying apparatus body 1 is directed from the exhaust gas blower 7 to the inside of heat transfer tube of the preheater 11, the direct fired reactor 12, the outside of heat transfer tube of the preheater 11, and the inside of heat transfer tube of the heat recovery apparatus 9 in that sequence.

Also, the outside air drawn into the drying apparatus body 1 is circulated in the drying apparatus body 1 by activating the blower for the first zone 5 and the blower for the second zone 6. Then, the air circulating in the drying apparatus body 1 is heated by igniting and burning the preheating burner 4.

The air in the drying apparatus body 1 is directed as the air for combustion from the exhaust gas blower 7 to the inside of heat transfer tube in the preheater 11 and to the direct fired reactor 12. Then, the fuel for the burner for deodorization 10 is ignited and burned The produced exhaust gas is directed from the outside of heat transfer tube of the preheater 11 to the inside of heat transfer tube of the heat recovery apparatus 9. This exhaust gas, after preheating the air, is discharged out of the drying apparatus body 1. Thus, the circulating air in the drying apparatus body 1 can be heated rapidly to a specified temperature at the startup before the normal operation.

When this condition is established, the preheating burner 4 is turned off to start the normal operation. In the normal operation, the paper 2 printed by the rotary printing press is fed into the drying apparatus body 1, while hot air is blown into the paper passage through the hot air blowing nozzles 3 so that the printed paper 2 is exposed to the hot air and the solvent contained in the ink on the paper is evaporated. The hot air containing the evaporated solvent (exhaust gas of about 140°-170° C.) is returned to the outside of heat transfer tube of heat recovery apparatus 9 at the suction side of the blower for the first zone 5 and the blower for the second zone 6, where the hot air is reheated to about 190°-250° C. by the exhaust gas passing through the inside of heat transfer tube of the heat recovery apparatus 9, namely the exhaust gas fed from the direct fired reactor 12 of the direct fired deodorizing apparatus 8 (exhaust gas of about 400°-500° C.), and directed to the hot air blowing nozzles 3.

Part of the hot air in the drying apparatus body 1 is sucked by the exhaust gas blower 7 and fed into the preheater 11 of the direct fired deodorizing apparatus 8, where part of the hot air is preheated by the exhaust gas from the direct fired reactor 12. Next, the hot air is directed to the direct fired reactor 12 which is heated to about 700°-1000° C. by the burner for deodorization 10, where the evaporated solvent in the hot air is burned for the deodorization of hot air. The exhaust gas produced at this time is directed to the inside of heat transfer tube of the heat recovery apparatus 9 for the above-described heat exchanging and is then discharged out of the drying apparatus body 1.

The heat recovery apparatus 9 can use a shell and tube heat exchanger or a plate type heat exchanger.

When drying is controlled based on the hot air temperature, the set value of deodorizing apparatus furnace temperature on the hot air temperature control device 13 is calculated for correction from the value detected by the blowing hot air temperature sensor 16. Based on the result, the burning amount of the burner for deodorization 10 is controlled, and the temperature of hot air blowing from the nozzles is kept at the set value.

When drying is performed by paper temperature control, the set value of deodorizing apparatus furnace temperature on the paper temperature control device 14 is calculated for correction from the value detected by the paper temperature sensor 17. Based on the result, the burning at the burner for deodorization 10 is controlled, and the temperature of hot air blowing from the nozzles is kept at the set value.

The conventional drying control device for the rotary printing press shown in FIG. 14 has the following disadvantage: since the deodorizing capability of the direct fired deodorizing apparatus 8 relates directly to the furnace temperature of direct fired reactor 12 as shown in FIG. 14, the furnace temperature must be not less than the lower limit $T_{DL}$ in order to comply with the regulations regarding the odor concentration For the conventional drying control device for the rotary printing press shown in FIG. 14, nevertheless, the furnace temperature of the direct fired deodorizing apparatus 8 is not controlled. For example, in the paper temperature control, when the thermal load is decreased (for example, when the printing speed decreases), the burning amount of the burner for deodorization 10 is decreased, sometimes resulting in a decrease in deodorizing apparatus furnace temperature down to a value less than the lower limit.

In the apparatus disclosed in Japanese Patent Application No. 083912/1989, the controllability is not high because the blowing hot air temperature does not respond to the temperature change in the reaction furnace 12 since the heat capacity of the heat exchanger 9 is high, when a speed change (i.e., thermal load fluctuation) occurs in the printing press or when an attempt is made to change a control target value (instrumental set value) of blowing hot air temperature.

Furthermore, according to this conventional art, the hot air can be heated in about one minute by using the preheating burner 4 at the startup, but the apparatus has no effective mechanism for cooling the hot air when the printing speed is decreased due to troubles or adjustments in the printing press during the normal operation. That is, the responsiveness of paper temperature is very low because the deodorizing apparatus furnace temperature has a lower limit for providing proper deodorizing capability and because the heat capacity of the heat exchanger is high Therefore, the paper temperature exceeds the specified value for a long period of time, resulting in a heavy paper loss.

BRIEF SUMMARY OF THE INVENTION

The object of this invention is to provide a drying apparatus in which the deodorizing apparatus furnace temperature is kept at a specified value, and the deodorizing apparatus furnace temperature does not decrease to a value less than the lower limit when the thermal load, such as the printing speed, changes.

To attain the above object, according to a first aspect of this invention, a drying apparatus for rotary printing press is provided in which hot air is blown onto printed paper to dry the printed paper by evaporating the solvent in ink, and this hot air is reheated by using the exhaust gas from the direct fired deodorizing apparatus, and which comprises a hot air temperature control device for correcting the set value of deodorizing apparatus furnace temperature on the basis of the value detected by a blowing hot air temperature sensor, a paper temperature control device for correcting the set value of deodorizing apparatus furnace temperature on the basis of the value detected by the paper temperature sensor, and a deodorizing apparatus furnace temperature control device for calculating the deodorizing apparatus furnace temperature on the basis of the corrected set value from the hot air temperature control device or the paper temperature control device and for controlling the burning at the burner for deodorization of the direct fired deodorizing apparatus on the basis of the calculation result.

Since the drying apparatus for rotary printing press according to this invention is constructed as described above, when drying is performed by paper temperature control, the set value of deodorizing apparatus furnace temperature on the paper temperature control device is corrected on the basis of the value detected by the paper temperature sensor, and the result is sent to the deodorizing apparatus furnace temperature control device. Based on the corrected set value and the value detected by the deodorizing apparatus furnace temperature sensor, the set value of deodorizing apparatus furnace temperature on the deodorizing apparatus furnace temperature control device is calculated. The calculation result is used to control the burning amount of the burner for deodorization to keep the paper temperature at the set value.

According to a second aspect of this invention, which improves on the invention disclosed in the Japanese Patent Application No. 083912/1989, a bypass line is installed on the first zone hot air circulation line to bypass the heat recovery apparatus 9, and the bypass amount is controlled by the paper temperature on the drying apparatus side or by the blowing hot air temperature in order to give a drying apparatus having high control responsiveness.

Furthermore, a means is provided to simultaneously control the furnace temperature of the direct fired reactor 12 on the basis of the blowing hot air temperature.

On changing the printing speed, the heat capacity is lowered because the hot air in the first zone hot air circulation line is bypassed without passing through the heat recovery apparatus. Therefore, the temperature of blowing hot air is rapidly changed by controlling the deodorizing apparatus furnace temperature, which enables the control to be carried out so that the paper temperature remains constant.

Further, according to a third aspect of this invention, the following three features may be utilized.

As shown in FIG. 4, (1) A bypass line is installed on the first zone hot air circulation line for bypassing the heat recovery apparatus 9, and a damper is disposed in the bypass line to control the bypass amount.

(2) The paper temperature control device 14 controls two elements: the degree of opening of bypass damper and the burning amount of preheating burner.

(3) The control output setting device is disposed to detect printing speeds at regular intervals and to reset the output value of paper temperature control device 14 to a specified value in accordance with the change rate of printing speed with time.

When the printing speed decreases during the operation of printing press, the paper temperature rises. Then, the paper temperature control device 14 operates the bypass damper 21 in the opening direction. Since the heat recovery apparatus 9, which is a heat source of hot air, is bypassed, the temperature of blowing hot air in the first zone is decreased, and at the same time the paper temperature returns to the original value.

This operation is performed by feedback control, and additionally the concept of feedforward control is adopted to further enhance the responsiveness The control output setting device resets the output value of the paper temperature control device to a specified value at the same time when the printing speed is changed so that the control element is suddenly changed. If the reset value is constant (for example, the degree of opening of bypass=100% when the speed decreases), a low change rate of printing speed act rather as an external disturbance; therefore, the device is designed so that the reset value is changed in accordance with the printing speed. When the printing speed is restored, that is, it is increased, the burning amount of preheating burner is increased suddenly. This means the same operation as that at the time of startup.

Further, according to a fourth aspect of this invention, the following three features may be utilized.

(1) A bypass line is installed on the first zone hot air circulation line in the first zone to bypass the heat recovery apparatus, and the degree of opening of damper in this bypass line is controlled by the paper temperature control device when the printing speed is decreased.

(2) When the printing speed is increased afterward, the existing preheating burner is ignited by the paper temperature control device and the burning amount is controlled, as with the case of startup. That is, operation is changed over from the bypass damper operation to the preheating burner operation.

(3) To compensate the stationary characteristics, the printing speed is detected, an arithmetic unit is provided to calculate the set value of deodorizing apparatus furnace temperature in accordance with the thermal load change of printed paper, and a deodorizing apparatus furnace temperature control device is provided to control the deodorizing apparatus furnace temperature by regulating the burning amount of the burner for deodorization.

The above features serve as follows:

When the printing speed is decreased during the operation of printing press, the paper temperature rises. Then, in FIG. 10, the paper temperature control device 14 operates the bypass damper 21 in the bypass line 20 in the opening direction. The temperature of blowing hot air in the first zone is decreased suddenly, and at the same time the paper temperature returns to the original value.

To protect the heat transfer tube of the heat recovery apparatus 9, part of the hot air from the blower 5 is directed to the heat recovery apparatus and joins to the hot air passing through the bypass line 20 at the exit side of the heat recovery apparatus 9. At this time, if the temperature of exhaust gas from the deodorizing apparatus 8 is high, the hot air temperature decreasing effect is inhibited. There is also a problem of heat resistance of the heat transfer tube of the heat recovery apparatus 9. Therefore, the arithmetic unit 26 calculates the set value of deodorizing apparatus furnace temperature in accordance with the printing speed, that is the thermal load of printed paper, to reduce the set value. The deodorizing apparatus furnace temperature control device 25 controls the burning amount of the burner for deodorization in response to the change in the set value.

When the temperature of printed paper is increased again, the same operation as that at the time of startup is performed.

Still further, according to a fifth aspect of this invention, an object of this invention is to provide a drying apparatus for rotary printing press with high control responsiveness as compared with the drying apparatus disclosed in the Japanese Patent Application No. 083912/1989.

In this embodiment, a bypass line is installed on the first zone heat recovery line to bypass the heat recovery apparatus 9, and the bypass amount is controlled by the paper temperature at the exit side of drying apparatus or by the blowing hot air temperature.

Furthermore, a means is provided to simultaneously control the furnace temperature of the direct fired reactor 12 based on the blowing hot air temperature or the paper temperature on the exit side of drying apparatus.

When the printing speed is changed, the heating amount of hot air in the first zone circulation line can be quickly controlled by directing part of the hot air in the heat recovery line to the bypass line.

Thus, together with the control of deodorizing apparatus furnace temperature, the temperature of blowing hot air is rapidly changed, enabling the control to be carried out so that the paper temperature is constant.

BRIEF DESCRIPTION OF THE DRAWINGS

FIG. 9 is a flowchart of control in a third embodiment of this invention.

DETAILED DESCRIPTION OF THE PREFERRED EMBODIMENTS

Figure 1:
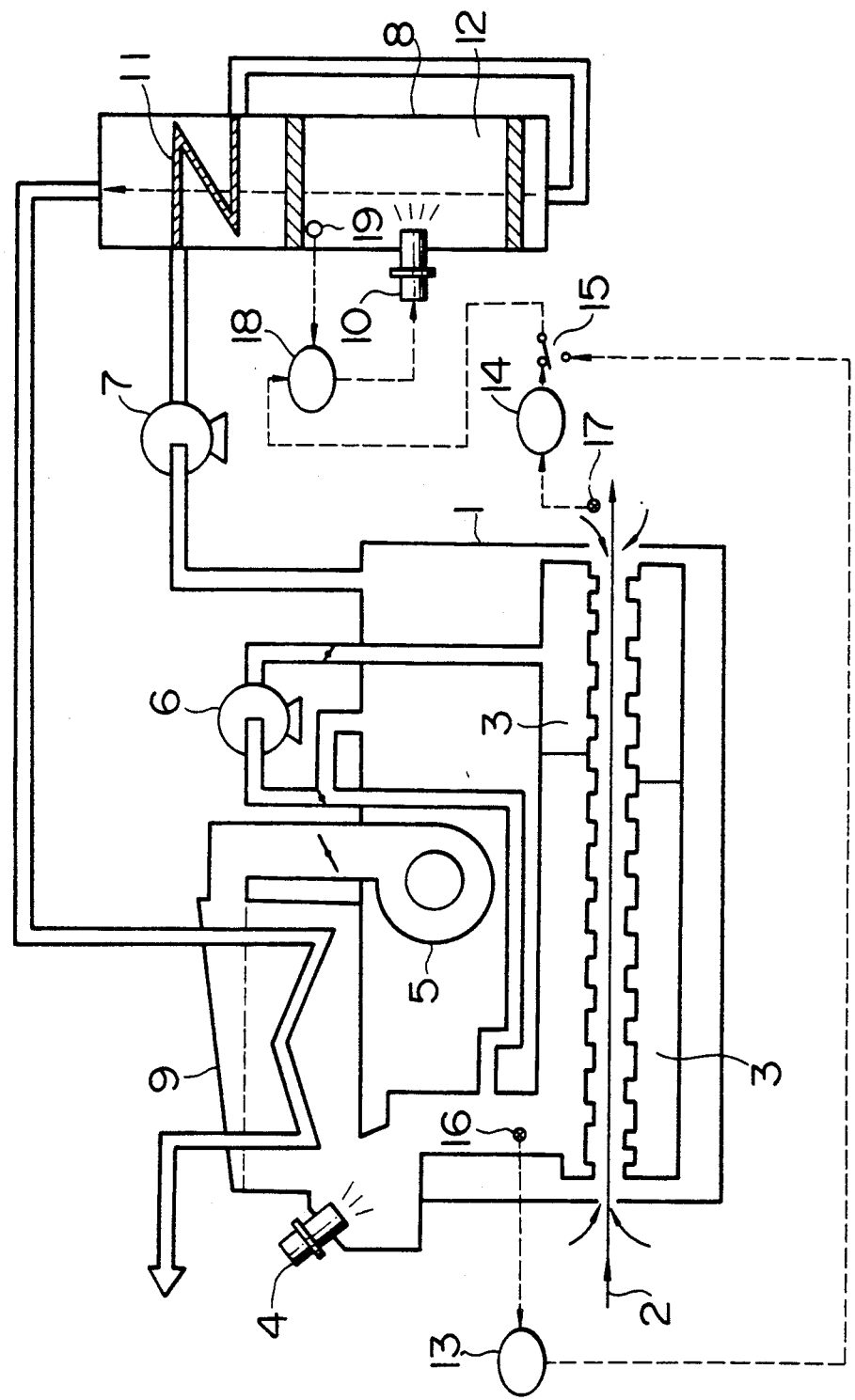
FIG. 1 is a schematic view of a first embodiment of the drying control device for the printed paper drying apparatus according to this invention.

The first embodiment of the drying apparatus for rotary printing press according to the first aspect of this invention is shown in FIG. 1. Reference numeral 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 13 denotes a hot air temperature control device, 14 denotes a paper temperature control device, 15 denotes a selector switch, 16 denotes a blowing hot air temperature sensor, 17 denotes a paper temperature sensor, 18 denotes a control device for deodorizing apparatus furnace temperature, and 19 denotes a deodorizing apparatus furnace temperature sensor.

Next, the operation of the drying apparatus for rotary printing press shown in FIG. 1 will be described specifically.

When drying is controlled based on the hot air temperature, the set value of deodorizing apparatus furnace temperature on the hot air temperature control device 13 is corrected on the basis of the value detected by the blowing hot air temperature sensor 16. The result is sent to the deodorizing apparatus furnace temperature control device 18. The set value in the control device 18 of deodorizing apparatus furnace temperature is calculated from this corrected set value and the detected value obtained from the deodorizing apparatus furnace temperature sensor 19. Based on the result, the burning amount of the burner for deodorization 10 is controlled, and the temperature of hot air blowing from the nozzles is kept at the set value.

When drying is controlled based on the paper temperature, the set value of deodorizing apparatus furnace temperature on the paper temperature control device 14 is corrected on the basis of the value detected by the paper temperature sensor 17. The result is sent to the deodorizing apparatus furnace temperature control device 18. The set value of deodorizing apparatus furnace temperature is calculated from this corrected set value and the detected value obtained from the deodorizing apparatus furnace temperature sensor 19. Based on the result, the burning amount of the burner for deodorization 10 is controlled, and the temperature of hot air blowing from the nozzles is kept at the set value.

For example, when the printing speed is decreased and the paper temperature is increased, the set value for deodorizing apparatus furnace temperature on the paper temperature control device 14 is reduced on the basis of the value detected by the paper temperature sensor 17. The set value of deodorizing apparatus furnace temperature on the deodorizing apparatus furnace temperature control device 18 is calculated from the reduced set value and the detected value obtained from the deodorizing apparatus furnace temperature sensor 19. Based on the result, the burning amount of the burner for deodorization 10 is decreased to keep the paper temperature at the set value.

In the drying apparatus for rotary printing press according to the first aspect of this invention, for example, when the paper temperature control is used as described above, the set value of deodorizing apparatus furnace temperature on the paper temperature control device is corrected on the basis of the value detected by the paper temperature sensor, and the result is sent to the deodorizing apparatus furnace temperature control device. The set value of deodorizing apparatus furnace temperature on the deodorizing apparatus furnace temperature control device is calculated from the corrected set value and the detected value obtained from the deodorizing apparatus furnace temperature sensor. Based on the result, the burning amount of the burner for deodorization is controlled to keep the paper temperature at the set value.

Thus, since the furnace temperature of the direct fired deodorizing apparatus is controlled, the deodorizing apparatus furnace temperature can be kept at the set value when the printing speed or other thermal load is changed, so that the deodorizing apparatus furnace temperature is not decreased to a value less than the lower limit.

The second embodiment of the drying apparatus for rotary printing press according to the second aspect of this invention will be described with reference to FIGS. 2 and 3.

Figure 2:
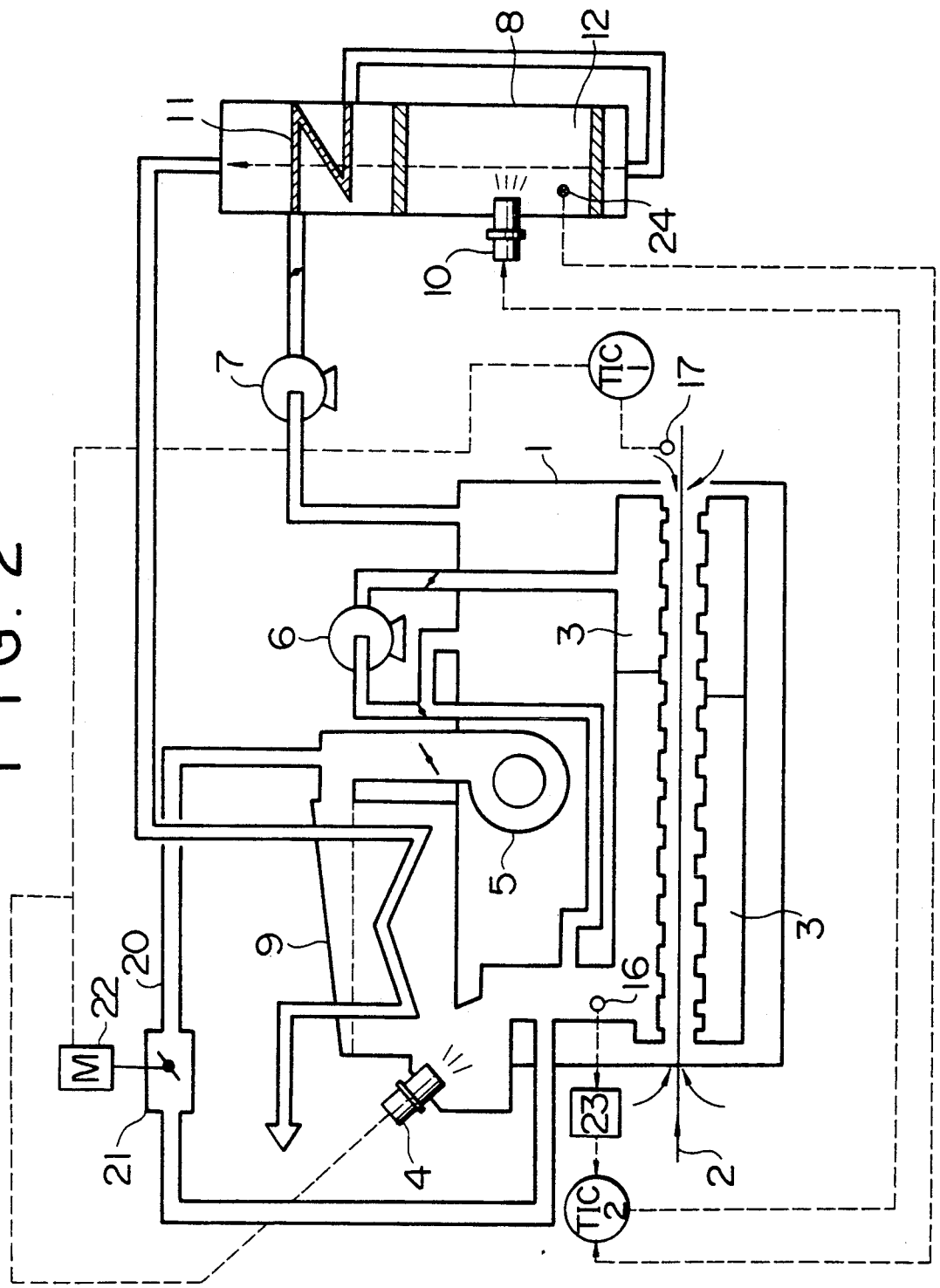
FIG. 2 is a schematic view of a second embodiment of the drying control device for the printed paper drying apparatus according to this invention.

In FIG. 2, reference numeral 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 16 denotes a hot air temperature sensor for the first zone, 17 denotes a paper temperature sensor, 20 denotes a bypass line, 21 denotes an automatic bypass damper, 22 denotes a motor or cylinder, 23 denotes a function generator, 24 denotes a deodorizing apparatus furnace temperature sensor, TIC-1 denotes a paper temperature regulator, and TIC-2 denotes a deodorizing apparatus furnace temperature regulator.

Figure 14:
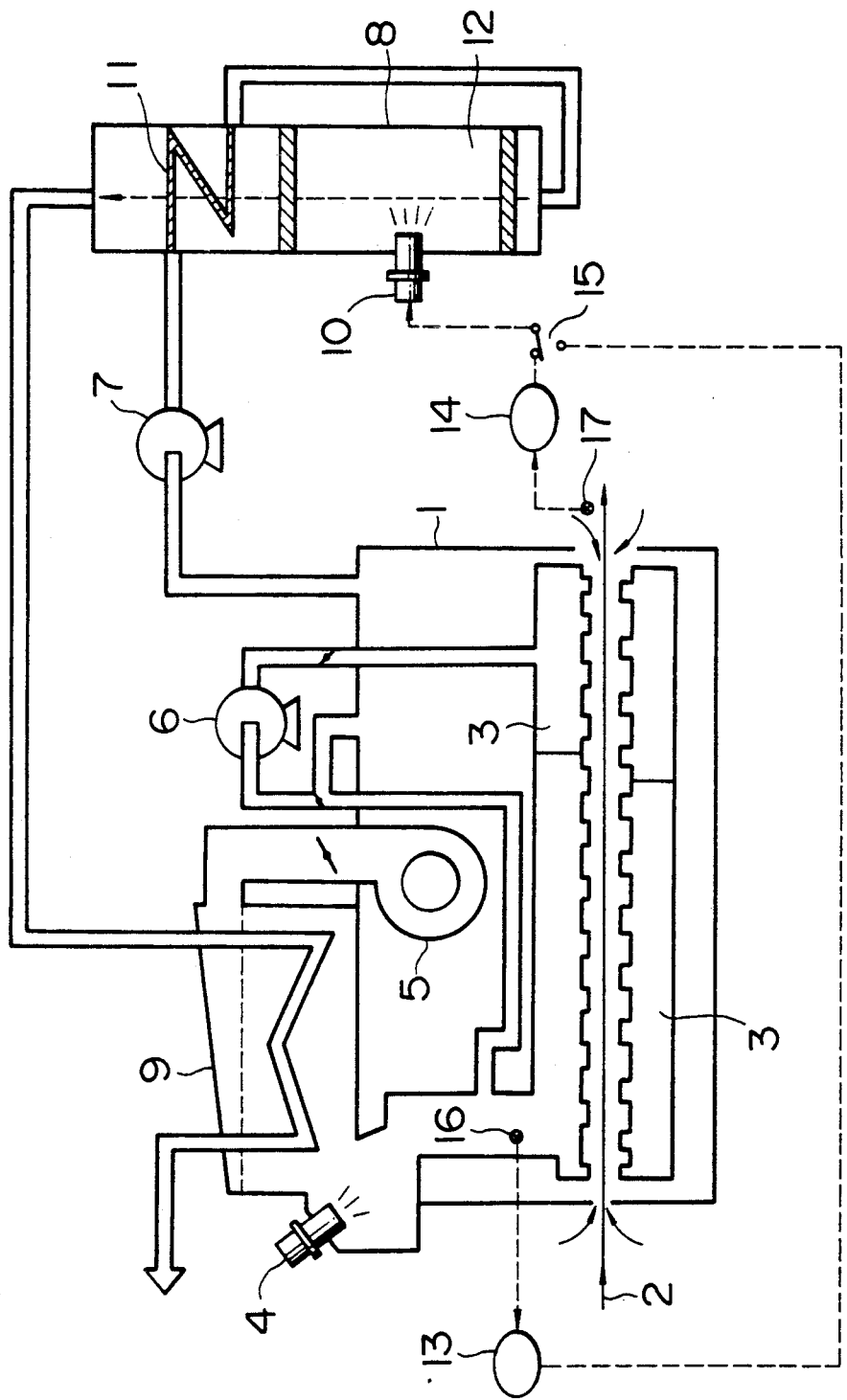
FIG. 14 is a schematic view of another typical conventional drying apparatus.
Figure 15:
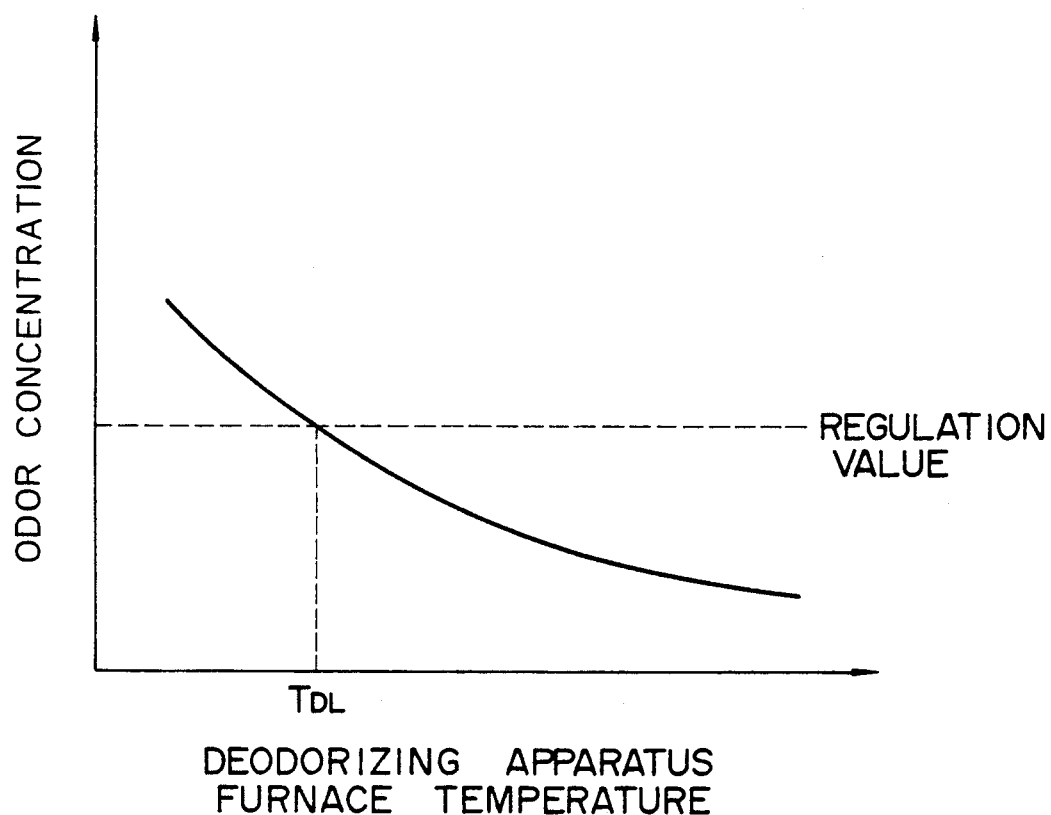
FIG. 15 is a graph showing the relationship between the deodorizing apparatus furnace temperature and the odor concentration in exhaust gas.

The principal configuration of this embodiment is the same as that of the drying apparatus shown in FIG. 14, except that a bypass line 20 is installed on the first zone hot air circulation line, and an automatic bypass damper 21 is disposed midway in the line 20. The paper temperature regulator TIC-1 is linked to the motor 22 (or cylinder) disposed to the automatic bypass damper 21 and the preheating burner 4 for startup in order to send control signals. The odorizing apparatus furnace temperature regulator TIC-2 controls the burning amount of the burner for deodorization so that the furnace temperature obtained from the deodorizing apparatus furnace temperature sensor 24 takes a specified value, via the function generator 23 which calculates the output in accordance with the temperature signal of the first zone hot air temperature sensor 16.

Next, the operation of the drying apparatus for rotary printing press shown in FIG. 2 will be described specifically. At the startup before the normal operation, the exhaust gas blower 7 is activated to draw the outside air (air for combustion) into the drying apparatus body 1. The outside air drawn into the drying apparatus body 1 is directed from the exhaust gas blower 7 to the inside of heat transfer tube of the preheater 11, the direct fired reactor 12, the outside of heat transfer tube of the preheater 11, and the inside of heat transfer tube of the heat recovery apparatus 9 in that sequence.

Also, the outside air drawn into the drying apparatus body 1 is circulated in the drying apparatus body 1 by activating the blower for the first zone 5 and the blower for the second zone 6. Then, the air circulating in the drying apparatus body 1 is heated by igniting and burning the preheating burner 4.

The air in the drying apparatus body 1 is directed as the air for combustion from the exhaust gas blower 7 to the inside of heat transfer tube in the preheater 11 and to the direct fired reactor 12. Then, the fuel for the burner for deodorization 10 is ignited and burned. The produced exhaust gas is directed from the outside of heat transfer tube of the preheater 11 to the inside of heat transfer tube of the heat recovery apparatus 9. This exhaust gas, after preheating the air circulating in the drying apparatus body 1, is discharged out of the drying apparatus body 1. Thus, the circulating air in the drying apparatus body 1 can be heated rapidly to a specified temperature at the startup before the normal operation.

When this condition is established, the preheating burner 4 is turned off to start the normal operation. In the normal operation, the paper 2 printed by the rotary printing press is fed into the drying apparatus body 1, while hot air is blown into the paper passage through the hot air blowing nozzles 3 so that the printed paper 2 is exposed to the hot air and the solvent contained in the ink on the paper is evaporated. The hot air containing the evaporated solvent (exhaust gas of about 140°-170° C.) is returned to the outside of heat transfer tube of heat recovery apparatus 9 at the suction side of the blower for the first zone 5 and the blower for the second zone 6, where the hot air is reheated to about 190°-250° C. by the exhaust gas passing through the inside of heat transfer tube of the heat recovery apparatus 9, namely the exhaust gas fed from the direct fired reactor 12 of the direct fired deodorizing apparatus 8 (exhaust gas of about 400°-500° C.), and directed to the hot air blowing nozzles 3.

Part of the hot air in the drying apparatus body 1 is sucked by the exhaust gas blower 7 and fed into the preheater 11 of the direct fired deodorizing apparatus 8, where part of the hot air is preheated by the exhaust gas from the direct fired reactor 12. Next, the hot air is directed to the direct fired reactor 12 which is heated to about 700°-1000° C. by the burner for deodorization 10, where the evaporated solvent in the hot air is burned for the deodorization of hot air. The exhaust gas produced at this time is directed to the inside of heat transfer tube of the heat recovery apparatus 9 for the above-described heat exchanging and is then discharged out of the drying apparatus body 1.

Figure 3:
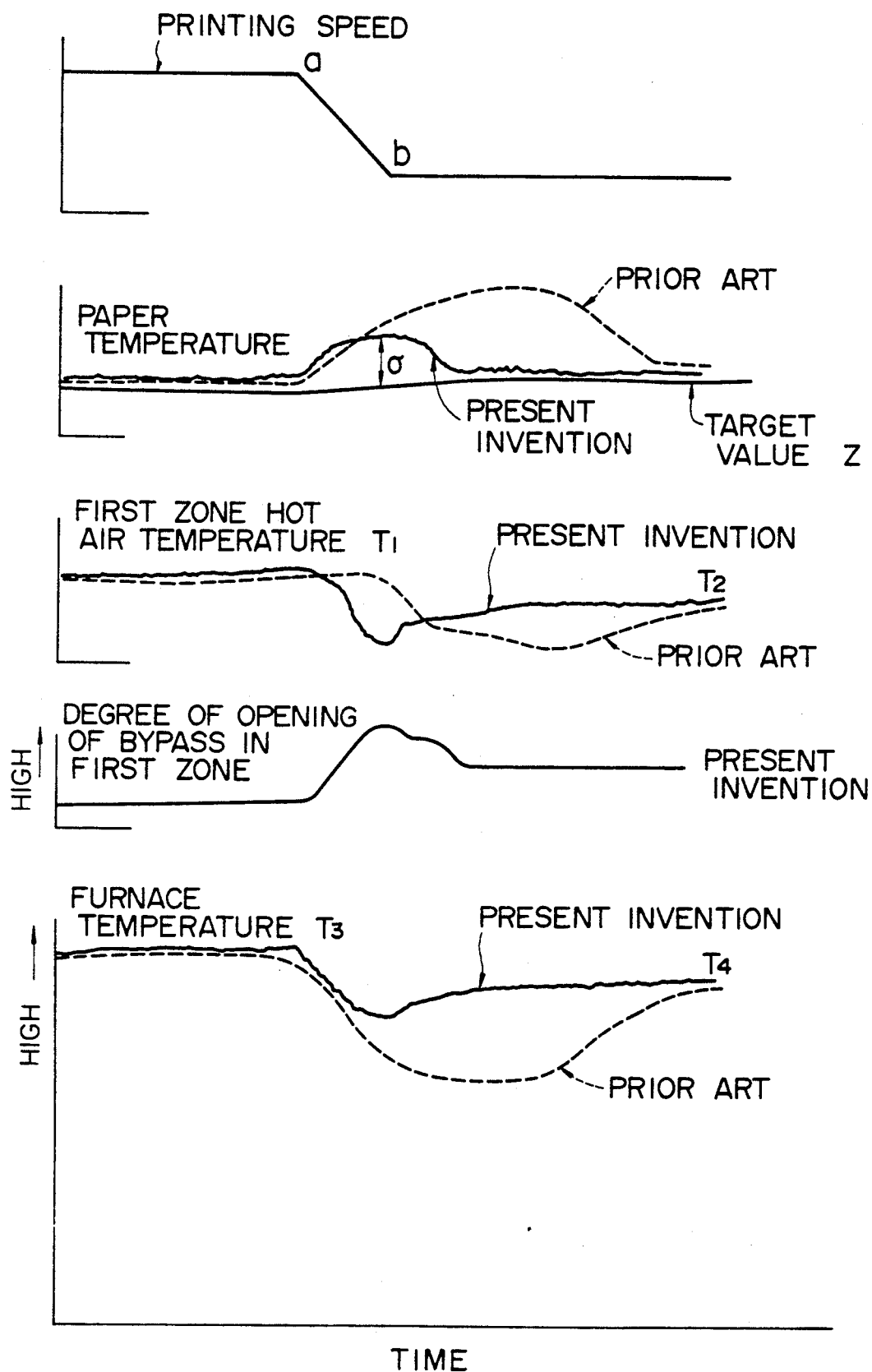
FIG. 3 is a graph comparing the controllability of the drying apparatus of this invention with that of the drying apparatus of conventional art shown in FIG. 14.
Figure 4:
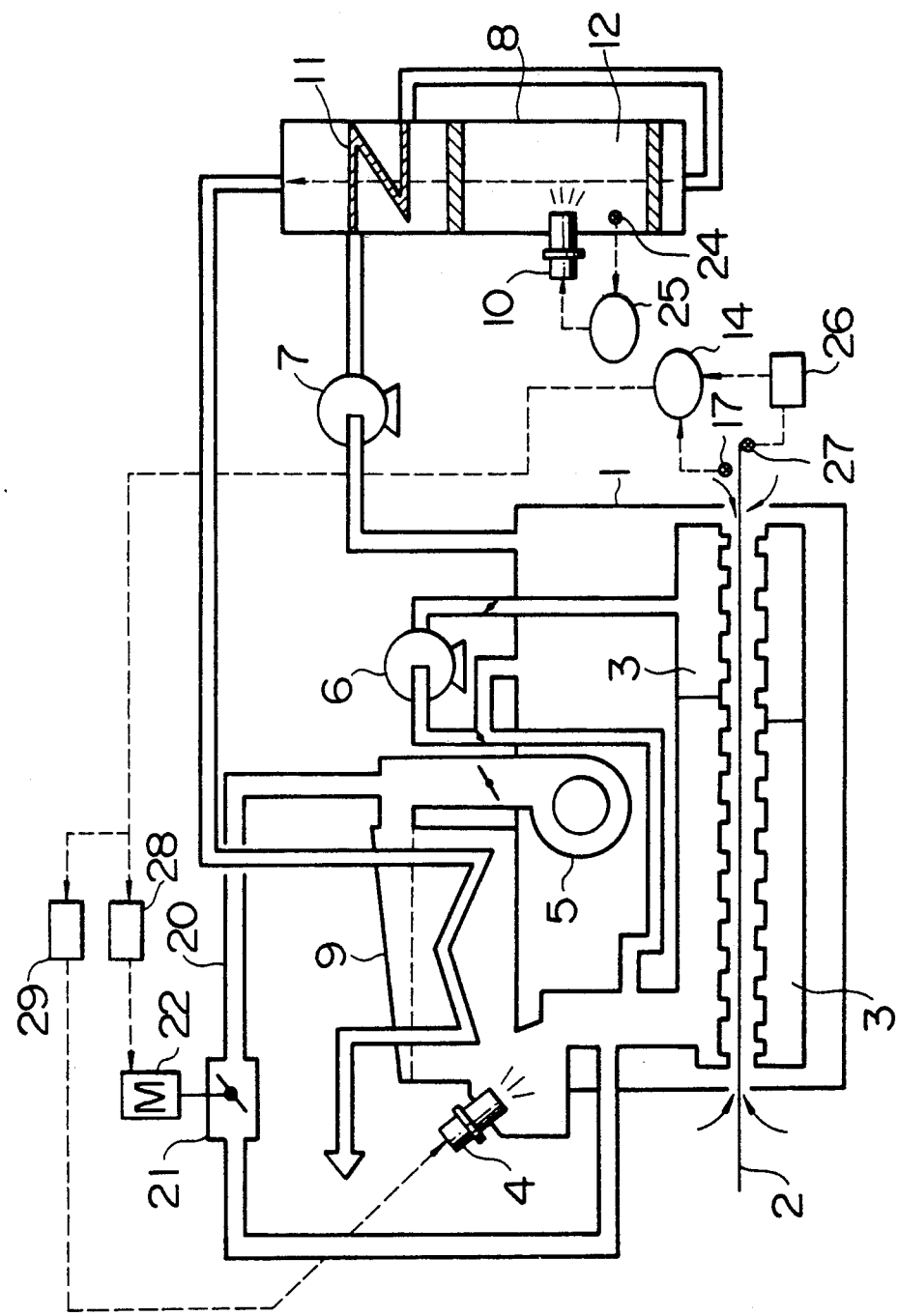
FIG. 4 is a schematic view of a third embodiment of the drying control device for the printed paper drying apparatus according to this invention.

FIG. 3 shows the relationship between the degree of opening of the control damper 21 disposed in the first zone hot air circulation line 20 and the paper temperature (temperature sensor 17) or the hot air blowing temperature (temperature sensor 16) and also the relationship between the degree of opening of the control damper 21 and the furnace temperature of the direct fired reactor 12.

When the printing speed is changed during the operation of printing press, for example, when the printing speed is decreased from a to b, the paper temperature begins increasing. Thus, the deviation $\sigma$ of actual paper temperature from the target value Z of paper temperature increases gradually. Therefore, to decrease the deviation $\sigma$, control is carried out to open the bypass damper 21 in the first zone hot air circulation line 20 so that the temperature of hot air in the first zone is decreased.

Thus, the hot air temperature in the first zone $T_1$ is suddenly decreased, and the paper temperature is soon returned to the target value Z. By determining the furnace temperature $T_3$ in the deodorizing apparatus 8 corresponding to the hot air temperature in the first zone $T_1$ by an equation of $T_3 = f(T_1)$, the furnace temperature of the deodorizing apparatus 8 decreases in accordance with the hot air temperature in the first zone, so that a certain heat recovery rate can be secured.

For example, in the conventional drying apparatus disclosed in the Japanese Patent Application No. 083912/1989, since the hot air temperature in the first zone is controlled only by the control of furnace temperature, the response of the paper temperature is considerably delayed as compared with the present invention, as indicated by the dotted line in FIG. 3.

As described above, according to the second aspect of this invention, the drying of printed paper can be controlled with high responsiveness to the change in printing speed by controlling the furnace temperature of the deodorizing apparatus 8 corresponding to the hot air temperature in the first zone while controlling the degree of opening of the bypass damper 21 in the first zone circulation line 20 so that the paper temperature is constant.

For example, when the printing speed is changed from 375 m/min to 200 m/min, the temperature of printed paper begins increasing gradually from 125° C.

The paper temperature returns to the set value within one minute according to this invention, whereas it returns to the set value in 5-10 minutes in the apparatus disclosed in the Japanese Patent Application No. 083912/1989.

According to the second aspect of this invention, in the drying apparatus for rotary printing press for drying the ink on the printed paper having a direct fired deodorizing apparatus and a heat recovery apparatus for heating the hot air circulating in the drying apparatus by using the exhaust gas from the deodorizing apparatus, a bypass line is installed on the hot air circulation line to bypass the heat recovery apparatus to control the paper temperature and/or blowing hot air temperature by regulating the degree of opening of bypass damper installed in the bypass line, and to control the burning amount of the burner for deodorization so that the deodorizing apparatus furnace temperature corresponding to the blowing hot air temperature is obtained. Therefore, this drying apparatus of this invention achieves the following effects:

(a) The apparatus is compact and has a low consumption of fuel.

(b) The apparatus has significantly high controllability against external disturbances such as changes in printing speed.

Next, the third embodiment of the paper temperature control device for drying apparatus, according to the third aspect of this invention, will be described with reference to FIGS. 4 through 9.

In FIGS. 4 through 9, 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 14 denotes a paper temperature control device, 17 denotes a paper temperature sensor, 20 denotes a bypass line, 21 denotes a damper, 22 denotes a motor (or cylinder), 24 denotes a deodorizing apparatus furnace temperature sensor, 25 denotes a deodorizing apparatus furnace temperature control device, 26 denotes a control output setting device, 27 denotes a printing speed sensor, and 28, 29 denote transducers.

Figure 5:
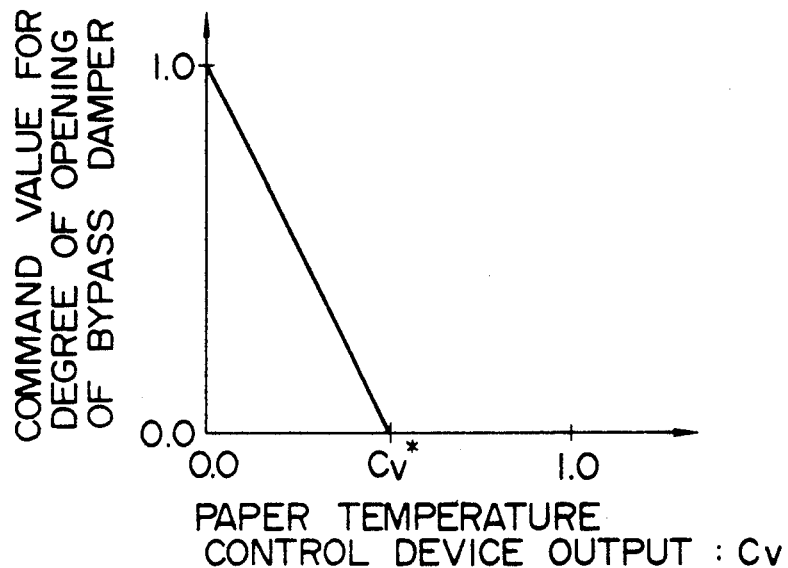
FIG. 5 is a graph showing the relationship between the paper temperature control device output and the command value for the degree of opening of bypass damper.
Figure 6:
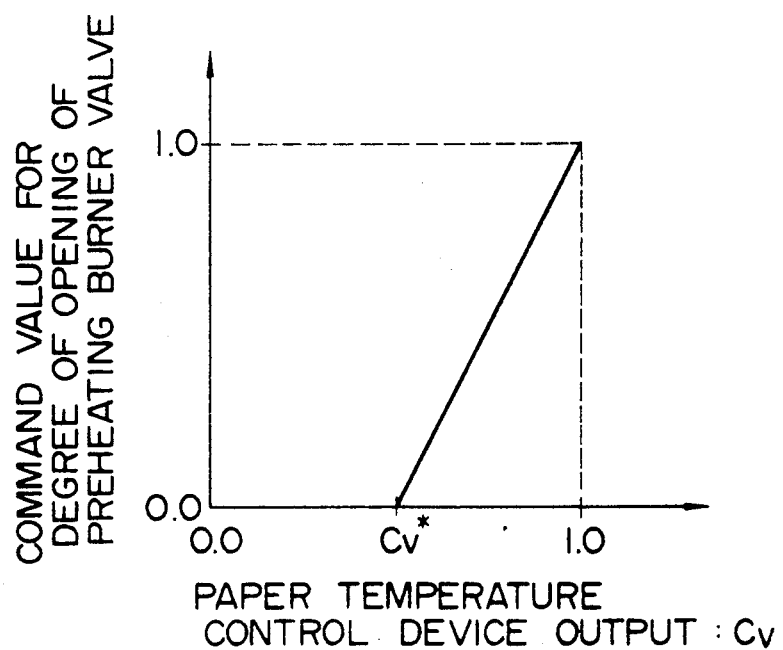
FIG. 6 is a graph showing the relationship between the paper temperature control device output and the command value for the degree of opening of preheating burner valve.

The bypass line 20 is installed on the first zone hot air circulation line, and the damper 21 is disposed midway in the bypass line 20. The paper temperature control device 14 is connected to the motor (or cylinder) 22 via the transducer 28, and to the preheating burner 4 via the transducer 29. The operations of transducers 28 and 29 are shown in FIG. 5 and 6, respectively. When the output $C_V$ of paper temperature control device 14 is $C_V > C_V^*$, the preheating burner valve opens/closes with the degree of opening of bypass damper being 0%; and when $C_V < C_V^*$, the bypass damper opens/closes with the degree of opening of preheating burner valve being 0% (i.e., not ignited). Thus, two operational elements can be operated by one control device.

Since the deodorizing capability depends on the furnace temperature of the deodorizing apparatus 8, a lower limit temperature for the deodorizing apparatus furnace temperature control device 25 is set to provide a desired deodorizing capability. The deodorizing apparatus furnace temperature control device 25 controls the burning amount of the burner for deodorization 10 so that the deodorizing apparatus furnace temperature detected by the sensor 24 is equal to the set value.

Figure 7:
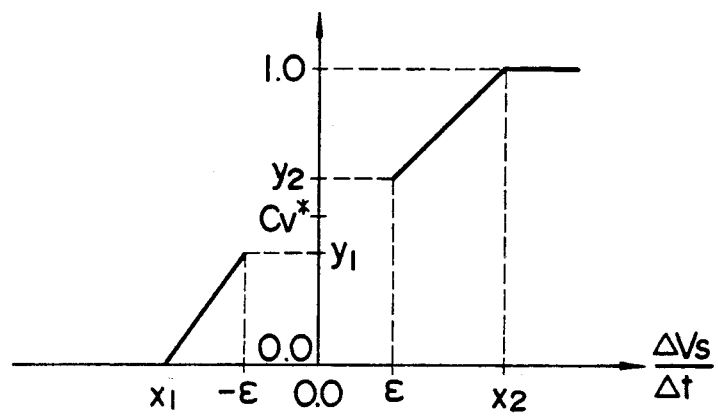
FIG. 7 is a graph showing an example of the calculation result for a preset manual setting device.

The control output setting device 26 provides a reset value of output of the paper temperature control device 14. While the printing speed sensor 27 detects printing speeds at a regular intervals $t_p$, the control output setting device 26 outputs the reset value in accordance with the change rate of printing speed with time ($\Delta V_s/t_p$). The paper temperature control device 14 resumes the PID (proportional-integral-derivative) operation with the reset value being used as the initial value. FIG. 7 shows a typical operation of the preset manual setting device. This figure indicates that when $|V_s/t_p| < \epsilon$ ($\epsilon$ is constant), there is no output. That is, the paper temperature control device 14 performs the normal PID operation. When $\Delta V_s/t_p > \sigma$, a reset value over $C_V^*$ is provided. Therefore, the degree of opening of preheating burner valve is reset to a value higher than 0% by the transducer 29. When $\Delta V_s/t_p < -\epsilon$, a reset value under $C_V^*$ is provided. Therefore, the degree of opening of preheating burner valve is reset to a value higher than 0% by the transducer 28.

For example, when the printing speed is decreased suddenly, the degree of opening of bypass damper immediately becomes 100%, which enables highly responsive operation without the operation delay due to feedback control.

Figure 8:
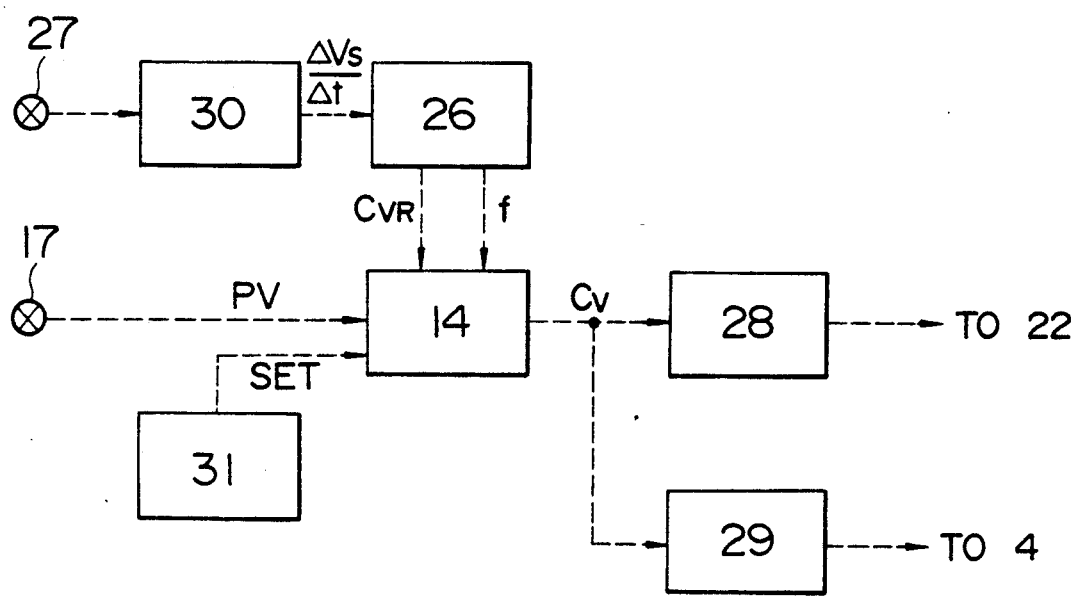
FIG. 8 is a diagram showing the details of the temperature and speed control mechanism for the drying apparatus shown in FIG. 4.

FIG. 8 shows further details of the configuration. In FIG. 8, reference numeral 30 denotes an arithmetic unit for the change rate of printing speed with time, which performs the following calculations at regular intervals (usually on the order of several seconds) $t_p$.

$$\frac{\Delta V_s}{\Delta t} = \frac{V_s(k) - V_s(k-1)}{t_p} \qquad \text{Eq. 1}$$

where,
 k : printing speed detection time,
 $V_s(k)$ : detected value of printing speed at the kth time point,
 $t_p$: calculation interval,
 $\Delta V_s/\Delta t$: change of printing speed with time.

The control output setting device 26 performs the following operations in accordance with the change rate of printing speed with time obtained from the arithmetic unit for the change rate of printing speed with time 30 at calculation intervals of $t_p$ (the details of operation is shown in FIG. 7), and outputs the operation result $C_{VR}$ (reset value of paper temperature control device output) and f (flag) for the paper temperature control device 14.

$$\text{If } x_2 \leq \frac{\Delta V_s}{\Delta t}, \quad C_{VR} = 1, \; f = 1 \qquad \text{Eq. 2.1}$$

$$\text{If } \epsilon \leq \frac{\Delta V_s}{\Delta t} < x_2, \qquad \text{Eq. 2.2}$$

$$C_{VR} = \frac{1 - y_2}{t_2 - \epsilon}\left(\frac{\Delta V_s}{\Delta t} - \epsilon\right) + y_2, f = 1$$

$$\text{If } -\epsilon \leq \frac{\Delta V_s}{\Delta t} < \epsilon, \; C_{VR} = \text{previous value}, f = 0 \qquad \text{Eq. 2.3}$$

$$\text{If } x_1 \leq \frac{\Delta V_s}{\Delta t} < -\epsilon, \qquad \text{Eq. 2.4}$$

$$C_{VR} = \frac{y_1}{-\epsilon - x_1}\left(\frac{\Delta V_s}{\Delta t} + \epsilon\right) + y_1, f = 1$$

-continued $$\text{If } \frac{\Delta V_s}{\Delta t} < x_1, \quad C_{VR} = 0, \quad f = 1 \qquad \text{Eq. 2.5}$$

where, $C_{VR}$: reset value of paper temperature control device output, f : flag, $x_1, x_2, y_1, y_2, \epsilon$: parameter given in advance.

The paper temperature control device 14 outputs the control output $C_V$ by the procedure shown in FIG. 9 from the input data of paper temperature detected by the paper temperature sensor 17, target value of paper temperature obtained from the setting device 31, and $C_{VR}$ and f obtained from the control output setting device 26.

Referring to FIG. 9, when f=0 (i.e., the change rate of printing speed with time is within $\pm\epsilon$), the paper temperature control device 14 performs the normal PID operation (the details are omitted). When f=1, the normal PID operation is not performed, but the paper temperature control device output is forcedly reset to the obtained control output value $C_{VR}$ in accordance with the change rate of printing speed with time. When f returns from 1 to 0 (the speed becomes constant), the PID operation is resumed with the reset value being used as the initial value.

The transducers 28 and 29 perform the operation shown in FIGS. 5 and 6 in accordance with $C_V$. They determine the command value for the degree of opening for bypass damper and the command value for the degree of opening of preheating burner valve, respectively, to control the degree of opening of bypass damper and preheating burner valve. The control output setting device 26 and the paper temperature control device 14 have a selector switch for deciding whether the operation is performed. When the switch is "OFF", flag=0 for the control output setting device 26 and $\{C_V=C_V{}^*, C_{VO}=C_V{}^*\}$ for the paper temperature control device 14 (refer to FIGS. 5 and 6). When the power supply is "ON", this switch is normally "OFF".

In the drying apparatus for rotary printing press according of this invention for drying the ink on the printed paper by the hot air heating method which has a direct fired deodorizing apparatus and a heat recovery apparatus for reheating the hot air circulating in the drying apparatus by using the exhaust gas from the deodorizing apparatus, the drying apparatus comprises a bypass line installed on the hot air circulation line to bypass the heat recovery apparatus, a control device for controlling the paper surface temperature to be the set value by regulating the degree of opening of damper installed in the bypass line or the burning amount of preheating burner, and a control output setting device for resetting the output value of the control device to a predetermined value in according with the change rate of printing speed with time when the change rate of printing speed with time exceeds a specified value. Therefore, this drying apparatus of this invention achieves the following effect.

When the printing speed decreases, the heat recovery apparatus, which is a heat source, is bypassed and the bypass amount is quickly changed in accordance with the change rate of printing speed, so that control can be performed without delay. As a result, the temperature of hot air is rapidly decreased, enabling the control of paper temperature to be carried out with high responsiveness. This increases the yield of product and decreases the loss of paper.

Next, the fourth embodiment of the drying apparatus for rotary printing press, according to the fourth aspect of this invention, will be described with reference to FIGS. 10 and 11.

Figure 10:
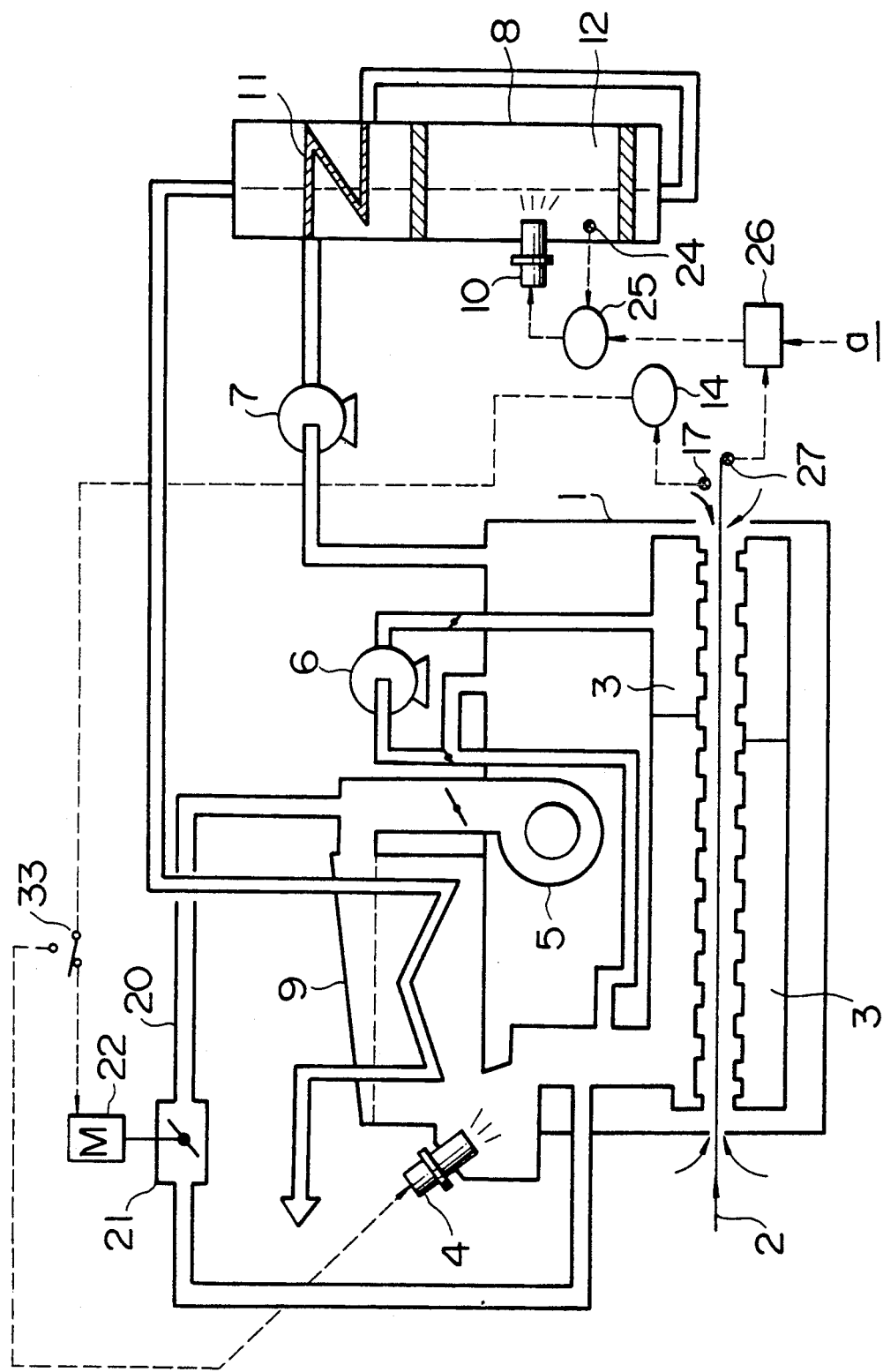
FIG. 10 is a schematic view of a fourth embodiment of the drying control device for the printed paper drying apparatus according to this invention.

In FIG. 10, 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 14 denotes a paper temperature control device, 17 denotes a paper temperature sensor, 20 denotes a bypass line, 21 denotes a damper, 22 denotes a motor for damper, 24 denotes a deodorizing apparatus furnace temperature sensor, 25 denotes a deodorizing apparatus furnace temperature control device, 26 denotes an arithmetic unit, 27 denotes a printing speed sensor, 33 denotes a selector switch, and a denotes printing conditions (basis weight and width of paper, target paper temperature).

The bypass line 20 is installed on the first zone hot air circulation line, and the damper is disposed midway in the line 20. The paper temperature control device 14 is connected to the motor (or cylinder) mounted to the damper 21 and the preheating burner 4. The operator can change over the connection with the selector switch 33. The connection may be changed over in accordance with the increase/decrease in printing speed. At the moment when the connection is changed over, the output of the paper temperature control device 14 is reset to 0. (That is, the degree of opening of damper or preheating burner valve is 0.)

The deodorizing apparatus furnace temperature control device 25 controls the burning amount of the burner for deodorization 10 so that the value detected by the deodorizing apparatus furnace temperature sensor 24 is equal to the set value which is the output of the arithmetic unit 26.

The arithmetic unit 26 calculates the thermal load $Q_S$ in accordance with the printing speed obtained from the paper speed sensor 27 and the printing conditions a which is inputted by the operator(G, W, $T_S$ shown below) by using, for example, the following equation.

$$Q_s = V \cdot G \cdot W \cdot (T_s - T_o) \cdot C \qquad \text{Eq. 3}$$

where $Q_S$: quantity of heat received by paper (Kcal/h),

V printing speed (m/h),

G : basis weight of printed paper (kg/m$^2$),

W : width of printed paper (m), $T_S$: target value of paper temperature (°C.), $T_O$: paper temperature at the entrance of drying apparatus (°C.), C : specific heat of printed paper (Kcal/kg °C.).

Figure 11:
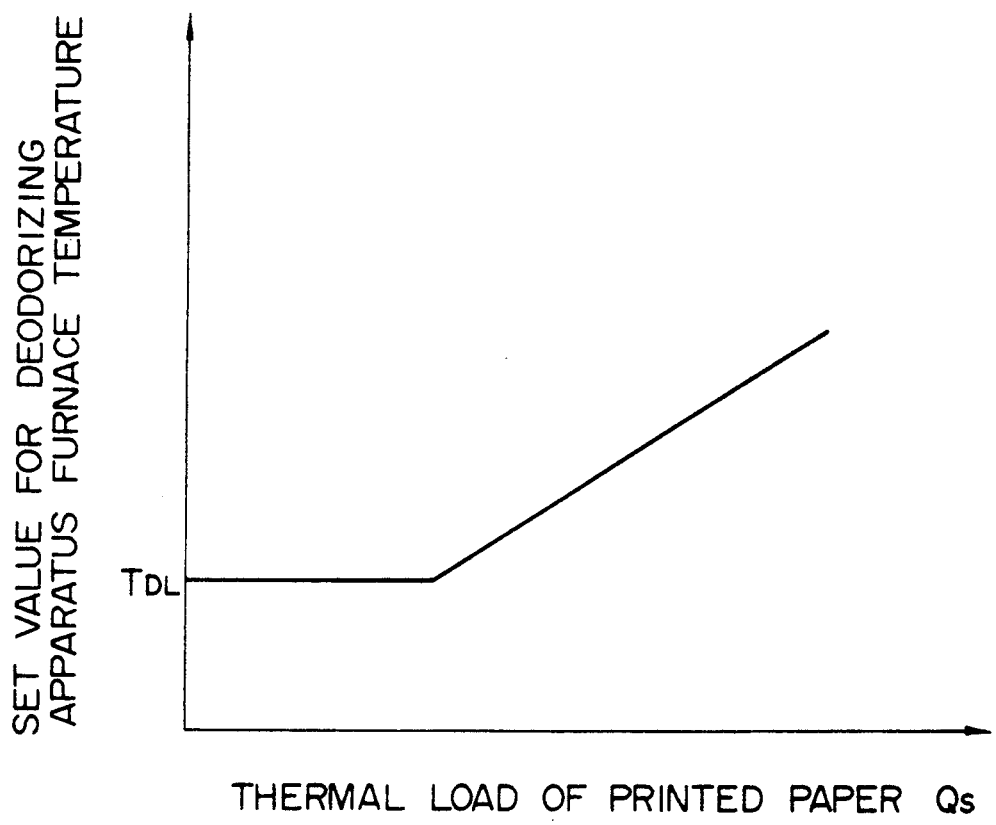
FIG. 11 is a graph showing the relationship between the thermal load of printed paper and the set value of deodorizing apparatus furnace temperature.

Furthermore, the set value of deodorizing apparatus furnace temperature is determined in accordance with $Q_S$ by using the relationship shown, for example, in FIG. 11, and sent to the deodorizing apparatus furnace temperature control device 25. The symbol $T_{DL}$ in FIG. 11 denotes the lower limit temperature satisfying proper deodorizing requirements.

In the drying apparatus for rotary printing press according to this invention for drying the ink on the printed paper by the hot air heating method which has a direct fired deodorizing apparatus and a heat recovery apparatus for reheating the hot air circulating in the drying apparatus by the exhaust gas from the deodorizing apparatus, the drying apparatus comprises a bypass line installed on the hot air circulation line to bypass the heat recovery apparatus, a control device for controlling the paper surface temperature to be the set value by operating the degree of opening of damper installed in the bypass line or the burning amount of preheating burner, and an arithmetic unit for calculating the set value of deodorizing apparatus furnace temperature in accordance with the thermal load of printed paper obtained by the detection of printing speed, and a control device for controlling the deodorizing apparatus furnace temperature to be the set value by controlling the burning amount of the burner for deodorization. Therefore, this drying apparatus of this invention achieves the following effect.

When the printing speed decreases, the temperature of hot air is quickly decreased by bypassing the heat recovery apparatus, enabling the control of paper temperature to be carried out with high responsiveness. This increases the yield of product and decreases the loss of paper.

Next, the fifth embodiment of the drying apparatus for rotary printing press, according to the fifth aspect of this invention, will be described with reference to FIG. 12.

Figure 12:
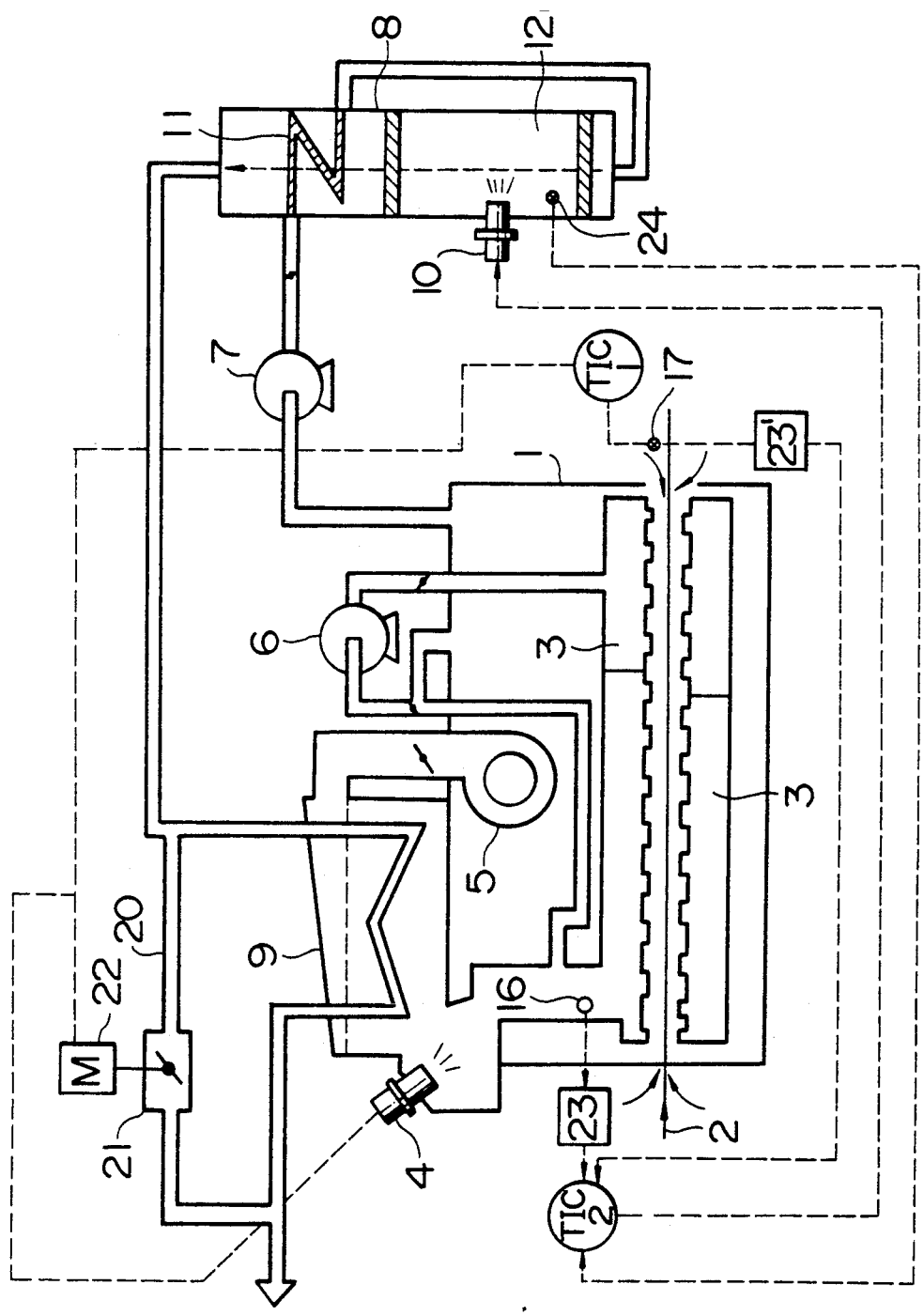
FIG. 12 is a schematic view of a fifth embodiment of the drying control device for the printed paper drying apparatus according to this invention.
Figure 13:
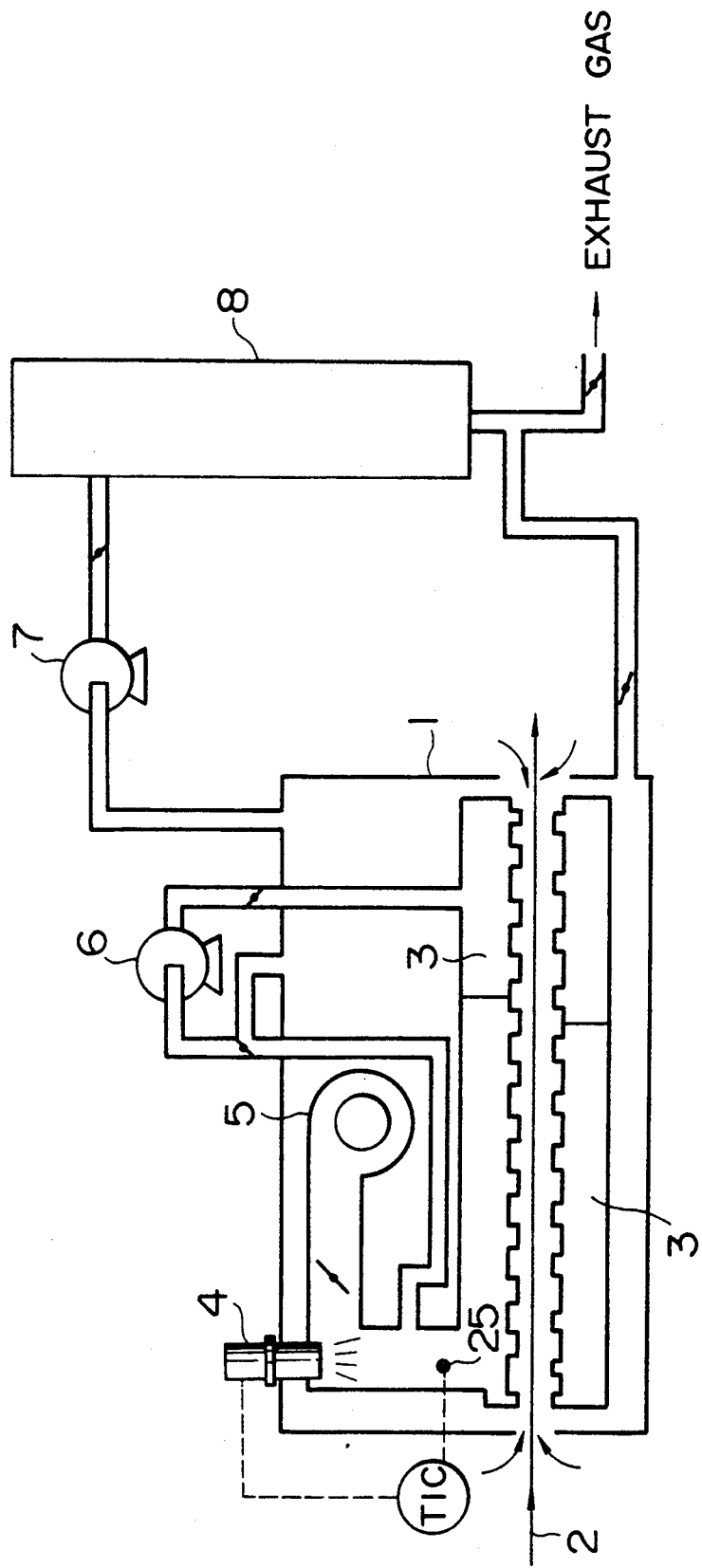
FIG. 13 is a schematic view of a typical conventional drying apparatus.

In FIG. 12, reference numeral 1 denotes a drying apparatus body, 2 denotes printed paper, 3 denotes a hot air blowing nozzle, 4 denotes a preheating burner, 5 denotes a blower for the first zone, 6 denotes a blower for the second zone, 7 denotes an exhaust gas blower, 8 denotes a direct fired deodorizing apparatus, 9 denotes a heat recovery apparatus, 10 denotes a burner for deodorization, 11 denotes a preheater, 12 denotes a direct fired reactor, 16 denotes a hot air temperature sensor for the first zone, 17 denotes a paper temperature sensor, 20 denotes a bypass line of the heat recovery line, 21 denotes an automatic bypass damper, 22 denotes a motor or cylinder, 23 denotes a function generator, 24 denotes a deodorizing apparatus furnace temperature sensor, TIC-1 denotes a paper temperature regulator, and TIC-2 denotes a deodorizing apparatus furnace temperature regulator.

The principal configuration of this embodiment is the same as that of the drying apparatus shown in FIG. 14, except that a bypass line 20 is installed on the first zone hot air circulation line, and an automatic bypass damper 21 is disposed midway in the line 20. The paper temperature regulator TIC-1 is linked to the motor 22 (or cylinder) mounted to the automatic bypass damper 21 and the preheating burner for startup 4 to send control signals.

The odorizing apparatus furnace temperature regulator TIC-2 controls the burning amount of the burner for deodorization so that the furnace temperature obtained from the deodorizing apparatus furnace temperature sensor 24 takes a specified value, via the function generator 23 which calculates the output in accordance with the temperature signal of the first zone hot air temperature sensor 16. The equivalent effect can be achieved when TIC-2 performs the control via a function generator 23' which calculates the output in accordance with the temperature signal of the paper temperature sensor 17.

Next, the operation of the drying apparatus for rotary printing press shown in FIG. 12 will be described specifically. At the startup before the normal operation, the exhaust gas blower 7 is activated to draw the outside air (air for combustion) into the drying apparatus body 1. The outside air drawn into the drying apparatus body 1 is directed from the exhaust gas blower 7 to the inside of heat transfer tube of the preheater 11, the direct fired reactor 12, the outside of heat transfer tube of the preheater 11, and the inside of heat transfer tube of the heat recovery apparatus 9 in that sequence.

Also, the outside air drawn into the drying apparatus body 1 is circulated in the drying apparatus body by activating the blower for the first zone 5 and the blower for the second zone 6. Then, the air circulating in the drying apparatus body 1 is heated by igniting and burning the preheating burner 4.

The air in the drying apparatus body 1 is directed as the air for combustion from the exhaust gas blower 7 to the inside of heat transfer tube in the preheater 11 and to the direct fired reactor 12. Then, the fuel for the burner for deodorization 10 is ignited and burned. The produced exhaust gas is directed from the outside of heat transfer tube of the preheater 11 to the inside of heat transfer tube of the heat recovery apparatus 9. This exhaust gas, after preheating the air circulating in the drying apparatus body 1, is discharged out of the drying apparatus body 1. Thus, the circulating air in the drying apparatus body 1 can be heated rapidly to a specified temperature at the startup before the normal operation.

When this condition is established, the preheating burner 4 is turned off to start the normal operation. In the normal operation, the paper 2 printed by the rotary printing press is fed into the drying apparatus body 1, while hot air is blown into the paper passage through the hot air blowing nozzles 3 so that the printed paper 2 is exposed to the hot air and the solvent contained in the ink on the paper is evaporated. The hot air containing the evaporated solvent (exhaust gas of about 140°–170° C.) is returned to the outside of heat transfer tube of heat recovery apparatus 9 at the suction side of the blower for the first zone 5 and the blower for the second zone 6, where the hot air is reheated to about 190°–250° C. by the exhaust gas passing through the inside of heat transfer tube of the heat recovery apparatus 9, namely the exhaust gas fed from the direct fired reactor 12 of the direct fired deodorizing apparatus 8 (exhaust gas of about 400°–500° C.), and directed to the hot air blowing nozzles 3.

Part of the hot air in the drying apparatus body 1 is sucked by the exhaust gas blower 7 and fed into the preheater 11 of the direct fired deodorizing apparatus 8, where part of the hot air is preheated by the exhaust gas from the direct fired reactor 12. Next, the hot air is directed to the direct fired reactor 12 which is heated to about 700°–1000° C. by the burner for deodorization 10, where the evaporated solvent in the hot air is burned for the deodorization of hot air. The exhaust gas produced at this time is directed to the inside of heat transfer tube of the heat recovery apparatus 9 for the above-described heat exchanging and is then discharged out of the drying apparatus body 1.

FIG: 3 shows the relationship between the degree of opening of the control damper 21 disposed in the first zone hot air circulation line 20 and the paper temperature (temperature sensor 17) or the hot air blowing temperature (temperature sensor 16) and also the relationship between the degree of opening of the control damper 21 and the furnace temperature of the direct fired reactor 12.

When the printing speed is changed during the operation of printing press, for example, when the printing speed is decreased from a to b, the paper temperature $T_S$ begins increasing. Thus, the deviation $\sigma$ of actual paper temperature $T_S$ from the target value Z of paper temperature increases gradually. Therefore, to decrease the deviation $\sigma$, control is carried out to open the bypass damper 21 in the first zone hot air circulation line 20 so that the temperature of hot air in the first zone is decreased. Thus, the hot air temperature in the first zone $T_1$ is suddenly decreased, and the paper temperature is soon returned to the target value Z. By determining the furnace temperature $T_3$ in the deodorizing apparatus 8 corresponding to the hot air temperature in the first zone $T_1$ or the paper temperature $T_S$ at the exit side of drying apparatus by an relational equation of $T_3 = f(T_1)$ or $T_3 = f(T_S)$, the furnace temperature of the deodorizing apparatus 8 decreases with the decrease in the first zone hot air temperature $T_1$ or with the increase in the paper temperature $T_S$, so that a certain heat recovery rate can be secured.

In the conventional drying apparatus disclosed in the Japanese Patent Application No. 083912/1989, since the hot air temperature in the first zone is controlled only by the control of furnace temperature, the response of the paper temperature is considerably delayed as compared with the present invention, as indicated by the dotted line in FIG. 3.

As described above, the drying of printed paper can be controlled with high responsiveness to the change in printing speed by regulating the furnace temperature in the deodorizing apparatus 8 corresponding to the first zone hot air temperature or the paper temperature while controlling the degree of opening of the bypass damper 21 in the first zone circulation line 20 so that the paper temperature is constant.

For example, when the printing speed is changed from 375 m/min to 200 m/min, the temperature of printed paper begins increasing gradually from 125° C.

The paper temperature returns to the set value within one minute according to this invention, whereas it returns to the set value in 5–10 minutes in the apparatus disclosed in the Japanese Patent Application No. 083912/1989.

According to the fifth aspect of this invention, in the drying apparatus for rotary printing press for drying the ink on the printed paper which has a direct fired deodorizing apparatus and a heat recovery apparatus for heating the hot air circulating in the drying apparatus by using the exhaust gas from the deodorizing apparatus, a bypass line is installed on the hot air circulation line to bypass the heat recovery apparatus to control the paper temperature and/or blowing hot air temperature by regulating the degree of opening of bypass damper disposed in the bypass line, and the burning amount of the burner for deodorization is controlled so that the deodorizing apparatus furnace temperature corresponding to the blowing hot air temperature or paper temperature is obtained. Therefore, this drying apparatus of this invention achieves the following effects:

(a) The apparatus is compact and has a low consumption of fuel.
(b) The apparatus has significantly high controllability against external disturbances such as changes in printing speed.

We claim:

1. A drying apparatus for a rotary printing press wherein hot air is blown onto paper printed in ink to dry the printed paper by evaporating solvent in the ink and the hot air is reheated by using exhaust gas from a direct fired deodorizing apparatus, said drying apparatus comprising:
a hot air temperature control device for correcting a set value for a deodorizing apparatus furnace temperature on the basis of a value detected by a temperature sensor of hot air blowing from nozzles;
a paper temperature control device for correcting the set value for the deodorizing apparatus furnace temperature on the basis of a value detected by a temperature sensor of printed paper;
a deodorizing apparatus furnace temperature sensor; and
a deodorizing apparatus furnace temperature control device for calculating said set value and controlling the burning amount of a burner for deodorization of a direct fired deodorizing apparatus on the basis of said set value in response to the value from one of said hot air temperature control device and said paper temperature control device and also on the basis of the value detected by said deodorizing apparatus furnace temperature sensor.

2. A drying apparatus for a rotary printing press for drying ink on printed paper which has a direct fired deodorizing apparatus and a heat recovery apparatus for heating hot air circulating in said drying apparatus by using exhaust gas of said deodorizing apparatus,
said drying apparatus comprising a bypass line installed on a hot air circulating line to bypass said heat recovery apparatus, means for controlling the temperature of printed paper and/or the temperature of hot air blowing from nozzles by adjusting the degree of opening of a bypass damper disposed in said bypass line, and means for controlling the burning amount of a burner for deodorization so that a deodorizing apparatus furnace temperature corresponds to the temperature of the hot air blowing from nozzles.

3. A drying apparatus for a rotary printing press for drying ink on printed paper which has a direct fired deodorizing apparatus, a preheating burner for heating hot air in said drying apparatus and a heat recovery apparatus for heating hot air circulating in said drying apparatus by using exhaust gas of said deodorizing apparatus, said drying apparatus comprising:
a bypass line installed on a hot air circulating line to bypass said heat recovery apparatus, temperature controlling means for controlling the temperature of printed paper and/or the temperature of hot air blowing from nozzles by adjusting the degree of opening of a bypass damper disposed in said bypass line and the burning amount of said preheating burner, and burner controlling means for controlling the burning amount of a burner for deodorization so that a deodorizing apparatus furnace temperature corresponds to the temperature of the hot air blowing from nozzles.

4. A drying apparatus according to claim 3 wherein said drying apparatus comprises a control output setting device which modifies a controlling function of said temperature controlling means in accordance with the change rate of printing speed with time when, as the printing speed is being detected, the change rate of printing speed with time exceeds a specified range.

5. A drying apparatus for a rotary printing press for drying ink on printed paper which has a direct fired deodorizing apparatus and a heat recovery apparatus for reheating hot air circulating in said drying apparatus by using exhaust gas of said deodorizing apparatus, said drying apparatus comprising:

a bypass line installed on a hot air circulating line to bypass said heat recovery apparatus, a control device for controlling the temperature of printed paper to be a specified value by adjusting the degree of opening of a damper disposed in said bypass line or the burning amount of a preheating burner, and a control output setting device for resetting the output of said control device to a specified value in accordance with a change rate of printing speed with time when, as printing speed is being detected, the change rate of printing speed with time exceeds a specified range.

6. A drying apparatus for a rotary printing press for drying ink on printed paper which has a direct fired deodorizing apparatus and a heat recovery apparatus for reheating hot air circulating in said drying apparatus by using exhaust gas of said deodorizing apparatus, said drying apparatus comprising:

a bypass line installed on a hot air circulation line to bypass said heat recovery apparatus, a control device for controlling the temperature of printed paper to be a specified value by adjusting the degree of opening of a damper disposed in said bypass line or the burning amount of a preheating burner, an arthrimetic unit for calculating the set value of deodorizing apparatus furnace temperature in accordance with the thermal load of printed paper obtained by detection of printing speed, and a control device for controlling the deodorizing apparatus furnace temperature to be said set value by adjusting the burning amount of a burner for deodorization.

7. A drying apparatus for a rotary printing press for drying ink on printed paper which has a direct fired deodorizing apparatus and a heat recovery apparatus for heating hot air circulating in said drying apparatus by using exhaust gas of said deodorizing apparatus, said drying apparatus comprising a bypass line installed on a hot line circulating line to bypass said heat recovery apparatus, whereby the temperature of printed paper and/or the temperature of hot air blowing from nozzles are controlled by adjusting the degree of opening of a bypass damper disposed in said bypass line, and the burning amount of a burner for deodorization is controlled so that a deodorizing apparatus furnace temperature corresponds to the temperature of hot air blowing from nozzles.

8. A drying apparatus for a rotary printing press for drying ink on printed paper which has a direct fired deodorizing apparatus and a heat recovery apparatus for heating hot air circulating in said drying apparatus by using exhaust gas of said deodorizing apparatus, said drying apparatus comprising a bypass line installed on a hot air circulating line to bypass said heat recovery apparatus, whereby the temperature of printed paper and/or the temperature of hot air blowing from nozzles are controlled by adjusting the degree of opening of a bypass damper disposed in said bypass line and the burning amount of a preheating burner, and the burning amount of a burner for deodorization is controlled so that a deodorizing apparatus furnace temperature corresponds to the temperature of the hot air blowing from nozzles.

* * * * *